United States Patent [19]
Atherton

[11] 4,307,423
[45] Dec. 22, 1981

[54] TEMPERATURE STABILIZATION CIRCUIT FOR CHARGE COUPLED PHOTODIODE ARRAY

[75] Inventor: Robert R. Atherton, Indianapolis, Ind.

[73] Assignee: The United States of America as represented by the Secretary of the Navy, Washington, D.C.

[21] Appl. No.: 141,076

[22] Filed: Apr. 17, 1980

[51] Int. Cl.³ ............................................... H04N 3/14
[52] U.S. Cl. .................................. 358/213; 358/163; 358/167
[58] Field of Search ........................ 358/163, 167, 213

[56] References Cited
U.S. PATENT DOCUMENTS

| | | |
|---|---|---|
| 3,790,705 | 2/1974 | Kamin . |
| 3,856,989 | 12/1974 | Weimer . |
| 3,904,818 | 9/1975 | Kovac . |
| 3,937,874 | 2/1976 | Carbone ............................. 358/213 |
| 3,949,162 | 4/1976 | Malueg . |
| 4,001,501 | 1/1977 | Weimer ............................. 358/160 |
| 4,045,816 | 8/1977 | Cave .................................. 358/212 |
| 4,145,721 | 3/1979 | Beaudouin et al. ................. 358/213 |

*Primary Examiner*—Richard Murray

[57] ABSTRACT

A temperature compensating circuit for a Charge Coupled Photodiode array which monitors a composite video output signal from a video processor and generates an error signal proportional to the square wave resulting from an unbalanced condition. The error signal is used to generate bias voltages which are applied to the Charge Coupled Photodiode array and a degenerative feedback loop is formed which nulls the error signal and automatically balances the array odd and even video outputs.

7 Claims, 11 Drawing Figures

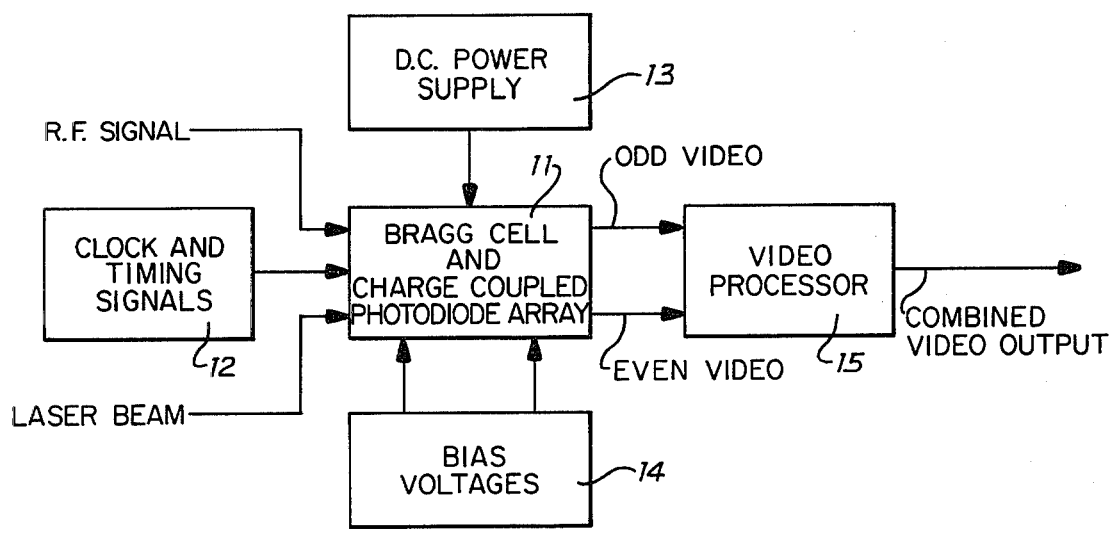
Fig.1
BALANCED-NO SIGNAL OUTPUT
Fig.2(a)
UNBALANCED-NO SIGNAL OUTPUT
Fig.2(b)
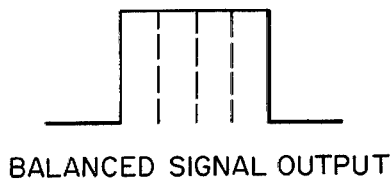
BALANCED SIGNAL OUTPUT
Fig.2(c)
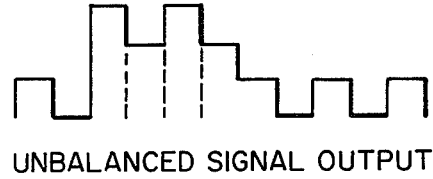
UNBALANCED SIGNAL OUTPUT
Fig.2(d)

$(2+4+6+7+5+3)-(3+5+7+6+4+2)$
$=(27-27)=0$ ERROR SIGNAL $(2+4+6+7+5+3)-(2\frac{1}{4}+3\frac{1}{4}+4\frac{1}{4}+3\frac{3}{4}+2\frac{3}{4}+1\frac{3}{4})$
$=(27-18)=9=$ ERROR SIGNAL

TEMPERATURE STABILIZATION CIRCUIT FOR CHARGE COUPLED PHOTODIODE ARRAY

BACKGROUND OF THE INVENTION

Charge Coupled Photodiodes utilize diffused photodiode sensors and incorporate CCD readout registers and output buffer amplifiers for low-noise signal extraction and thus combine the advantages of a Charge Coupled Device and a photodiode array. Two outputs from the array, designated even video and odd video, contain the useful information and these two outputs are combined in external video processing circuitry into one composite video circuit output.

Proper operation of the Charge Coupled Photodiode array requires that even and odd video output signals be balanced so that combination of these two signals gives a true composite video representation. In order to balance the video outputs, two individual bias voltages are applied to the odd input gate bias and even input gate bias terminals and are normally supplied through potentiometers to allow for optimum circuit performance. The usual adjustment procedure requires one bias voltage to be set to some nominal operating range and the other bias is adjusted to provide optimum balance between the odd and even outputs. However, temperature variations caused by equipment warmup and ambient temperature excursions require continual readjustment of the biasing circuits.

SUMMARY OF THE INVENTION

The present invention relates to a temperature compensating circuit and more particularly to an electronic circuit which monitors a video output signal which is a composite of odd and even output signals from a Charge Coupled Photodiode array and generates an error signal proportional to a square wave modulation which results from an unbalance of the odd and even output signals caused by a temperature change.

The composite video signal is brought through a pair of switches, which are gated in time synchronism with the odd and even video components of the composite video signal, to first and second unity gain buffer amplifiers. The buffering action of the first and second buffer amplifiers provides the constant source impedance to both input terminals of a differential amplifier, and a signal proportional to the difference in the odd and even components of the composite video input appears at the output of the differential amplifier. This phase sensitive error signal is applied to the input of an integrator and the integrator output supplies the odd gate bias voltage drive to the Charge Coupled Photodiode array. When active drive is applied to both bias terminals of the Charge Coupled Photodiode array, proper operation of the array requires that the two bias voltage drives be supplied in phase opposition. Accordingly, the output of the integrator is also fed to a unity gain inverting amplifier which supplies voltage drive to the even gate bias terminal.

It is therefore a general object of the present invention to provide a temperature compensating circuit for a Charge Coupled Photodiode array.

Other objects, advantages and novel features of the present invention will become apparent from the following detailed description of the invention when considered in conjunction with the accompanying drawings.

BRIEF DESCRIPTION OF THE DRAWINGS

FIG. 1 is a block diagram of a system using a Charge Coupled Photodiode array with which the present invention can be used;

FIGS. 2(a)–2(d) are drawings of waveforms to help explain the operation of the system shown in FIG. 1;

DESCRIPTION OF THE PREFERRED EMBODIMENT

Figure 3:
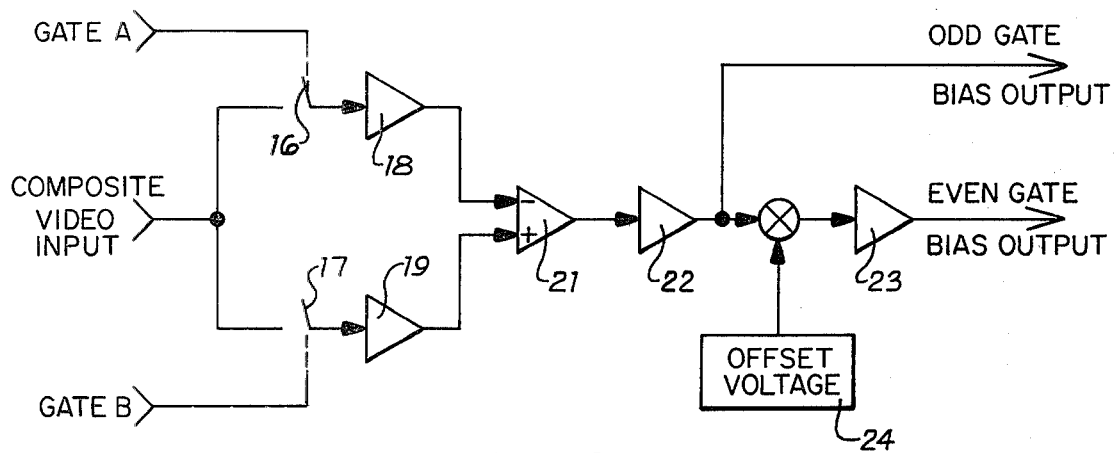
FIG. 3 is a block diagram of a preferred embodiment of the present invention.
Figure 4A:
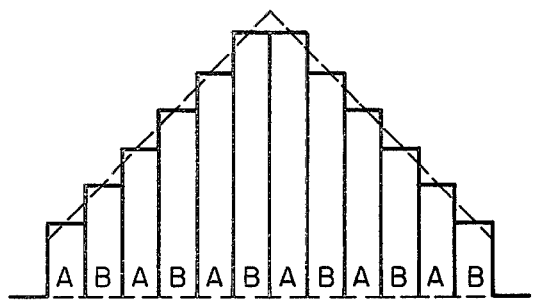
FIGS. 4(a)–4(d) are diagrams illustrating a method of error signal detection from a composite video signal produced by the system shown in FIG. 1.
Figure 4B:
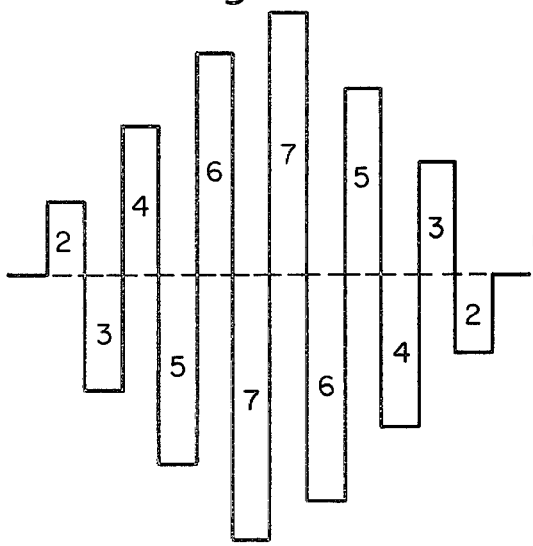
Figure 4C:
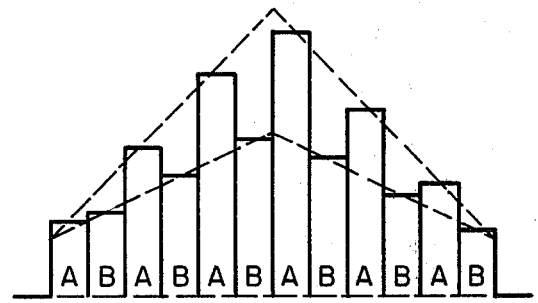
Figure 4D:
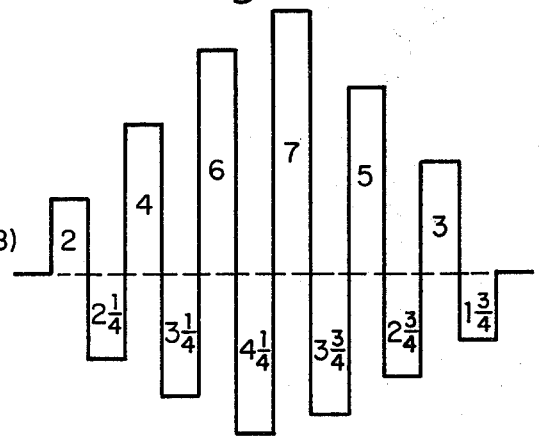

Referring now to the drawings, FIG. 1 shows one type of device with which the present invention might be used. There is illustrated a portion of an optical analyzer which forms part of an R. F. Spectrum analysis system. A Bragg cell and Charge Coupled Photodiode array 11 are part of a Spectrum analysis system and optical energy in the form of a laser beam impinges upon the Bragg cell, as one input thereto. A second input in the form of an electrical r. f. signal is also applied to the Bragg cell. The Bragg cell diffracts the incoming laser beam through a modulation process dependent upon the incoming electrical r. f. signal. The angular diffraction of the beam is dependent upon the r. f. signal frequency and the intensity of the diffracted beam is determined by the r. f. level or signal strength. The diffracted laser beam is optically coupled to an array of Charge Coupled Photodiodes and the array is scanned in a repetitive manner. The resulting serial electrical output is representative of the incoming r. f. signal spectrum.

A Charge Coupled Photodiode is a relatively new device and is a solid-state image sensor which combines the advantages of a Charge Coupled Device (CCD) and a photodiode array. Heretofore, users of solid-state image devices had to choose between Charge Coupled Devices, which had optimized low-noise readout and photodiode arrays which had optimized sensor characteristics. Although the low output capacitance of CCD imagers simplifies low-level signal extraction, the CCD sensing elements have a number of serious drawbacks. The semi-transparent electrode covering the sensing area causes gross optical interference effects throughout the visible spectrum and, in addition, absorbs strongly at short wavelengths, drastically reducing the blue response. In addition, CCD imagers have relatively low saturation charge, limiting their signal handling capability, and they typically have high dark currents which restrict their use to short integration times (high scan rates). While self-scanned photodiode arrays have a high output capacitance which makes low-level signal extraction more difficult, these devices have nearly ideal sensor characteristics. Photodiodes have full silicon spectral response including blue and UV, are free of interference effects, have a large signal handling capability, have little cross-talk or blooming, and have low dark currents.

Charge Coupled Photodiodes, which are made by Reticon Corporation, Sunnyvale, Calif., utilize diffused photodiode sensors and incorporate CCD readout registers and output buffer amplifiers for low-noise signal extraction. Also, Charge Coupled Photodiodes contain an anti-blooming gate which suppresses blooming and can also be used to set the integration period independently of the line rate.

Referring still to FIG. 1 of the drawings, the Charge Coupled Photodiode array requires multiphase clocking signals, timing pulses (12), a direct current supply (13), and bias voltages (14) for proper operation. Two outputs, designated even video and odd video contain the useful information. Video processing circuitry 15, which is external to the array, combines the two separate video signals into one composite video circuit output. In operation, laser light illuminates the p−n junction photodiodes of the Charge Coupled Photodiode array to generate photocurrents which are integrated and stored as charges on the capacitance of each photodiode. At the end of the integration period, the charges on all of the diodes are simultaneously switched into one of two CCD analog shift registers for readout. The odd and even diode charges are switched into opposite registers. Immediately following this transfer, the two shift registers are alternately clocked so as to yield the even and odd video outputs.

Referring now to FIG. 2 of the drawings proper operation of the Charge Coupled Photodiode array requires the even and odd video output signals to be balanced so that combination of these two signals gives a true composite video representation. To this end, two individual bias voltages are applied to the odd input gate bias and even input gate bias terminals of the Charge Coupled Photodiode. These bias voltages are normally supplied through potentiometers to allow for circuit performance optimization. The usual adjustment procedure requires one bias voltage to be set to come nominal operating range and the other bias adjusted to provide optimum balance between the odd and even outputs. FIG. 2(a) depicts the smooth baseline output that occurs with no input signal and proper balance established between the Charge Coupled Photodiode array even and odd video outputs. FIG. 2(b) illustrates the same no signal condition with unbalance existing between the two outputs. The unbalance manifests itself in the resulting square wave superimposed upon the baseline. The waveform of FIG. 2(c) represents a signal condition resulting from uniform illumination of four adjacent cells within the array. The baseline is smooth and the composite video, composed of the alternately equal even and odd video outputs, is likewise flat topped. The waveform of FIG. 2(d) shows the circuit output, again with uniform illumination of four adjacent cells of the array, but with unbalance between the array odd and even outputs. The unbalance condition is once again evident from the observed square wave superimposed upon both the baseline and video signals. This unbalanced condition of the baseline and video signals is undesirable in that it tends to obscure the true video signal and reduce system dynamic range. The unbalance effect previously described can be reduced to a minimal level by proper adjustment of the Charge Coupled Photodiode biasing circuits. However, because of temperature sensitivity of the Charge Coupled Photodiode array and its associated circuitry, this initial adjustment is valid for only one temperature. Temperature variations due to equipment warmup and ambient temperature excursions such as encountered in a military environment necessitate continual readjustment of the biasing circuitry to optimize circuit performance. In severe situations, this readjustment may be required every few minutes during a run of several hours.

Referring now to FIG. 3 of the drawings, there is shown an electronic circuit which monitors the composite video output signal from video processor 15 and generates an error signal proportional to the square wave resulting from the unbalance condition. The error signal is used to generate the bias voltages applied to the Charge Coupled Photodiode array and a degenerative feedback loop is formed which nulls the error signal and automatically balances the array odd and even video outputs. The composite video signal is brought through sample switches 16 and 17 to unity gain buffer amplifiers 18 and 19. The Gate A and Gate B inputs are logic generated signals which open and close switches 16 and 17 in time synchronism with the odd and even video outputs of the Charge Coupled Photodiode array. The alternate closing of switches 16 and 17 routes the even and odd video components of the composite video signal to opposite inputs of differential amplifier 21. The buffering action of amplifiers 18 and 19 provides the constant source impedance to both input terminals of amplifier 21 required for proper differential amplifier operation. A signal proportional to the difference in the odd and even components of the composite video input appears at the output of amplifier 21. This phase sensitive error signal is applied to the input of integrator 22, and integrator 22 output supplies the odd gate bias voltage drive to the Charge Coupled Photodiode array. When active drive is applied to both bias terminals of the Charge Coupled Photodiode array, proper operation of the array requires that the two bias voltage drives be supplied in phase opposition. That is, increasing the voltage drive to, say, the odd gate bias terminal, necessitates reducing the voltage applied to the even gate bias terminal. Therefore, the output of integrator 22 is fed to unity gain inverting amplifier 23, which then supplies voltage drive to the even gate bias terminal. Since amplifier 23 is required to supply a positive output with the positive input voltage from amplifier 22 (both gate bias terminal voltages must be positive even though they are driven in phase opposition), an adjustable dc offset voltage 24 is also summed into the input of amplifier 23. Variable offset voltage 24 permits the operating point of the two bias voltages to be adjusted for optimum circuit performance during closed loop operation.

Referring now to FIG. 4 of the drawings there is illustrated the method of error signal detection from the composite video signal. The solid portion of the upper waveform in FIG. 4(a) shows a hypothetical composite video signal resulting from the Charge Coupled Photodiode array being illuminated in a manner represented by the dashed curve of FIG. 4(a), with perfect balance established between the array odd and even video outputs. The alternate odd and even component outputs of the composite signal are labeled A and B, respectively. The waveform shown in FIG. 4(b) shows the result of the subtraction process, (A−B), performed by the differential amplifier 21. The area in total squares of each rectangular segment of the (A−B) waveform is labeled and the net area, which is proportional to the closed loop error signal, is seen to be equal to zero in FIG 4(a), the condition depicting perfect odd/even video balance. FIG. 4(c) illustrates the same video waveform with unbalance existing between the odd and even components of the composite video signal. The unbalance manifests itself by effectively causing the odd and even video components to display dissimilar channel gains. Thus the A and B components of FIG. 4(c) are effectively the result of sampling two different amplitude signals, represented by the two dashed triangular segments. The difference signal, (A−B), shown in FIG. 4(d) shows that an error signal of 9 total square now exists. Computation shows the difference in areas under the two triangular waveforms to be 18 total squares and the error signal is proportional to the area difference. Interchanging the A & B samples reverses the sign of the error, thus showing the error phase sensitivity. The error signal amplitude in squares is actually one half of the area difference of the two triangular waveforms, the one half factor resulting from the 50 percent duty cycle sampling of the two triangular waveforms. It should be noted that only unbalance between the even and odd video outputs of the Charge Coupled Photodiode array produces an error signal. True signals, as represented in FIG. 4(a), produce no error. When the error signal becomes zero, the outputs of integrator 22 and, hence, amplifier 23 stop changing. This action holds bias driving voltage outputs of integrator 22 and amplifier 23 at that level required to yield zero error signal. Any tendency toward video unbalance will produce an error signal which repositions the dc output levels of integrator 22 and amplifier 23, so as to null the resulting error. Smoothing of the error signal is accomplished in integrator 22. Since the circuit need only track thermal drift rates, loop response time can be long. Making the integrator time constant many times longer than one complete scan interval of the Charge Coupled Photodiode also insures that integrator 22 is the dominate time constant in the loop and provides good closed loop dynamics.

Figure 5:
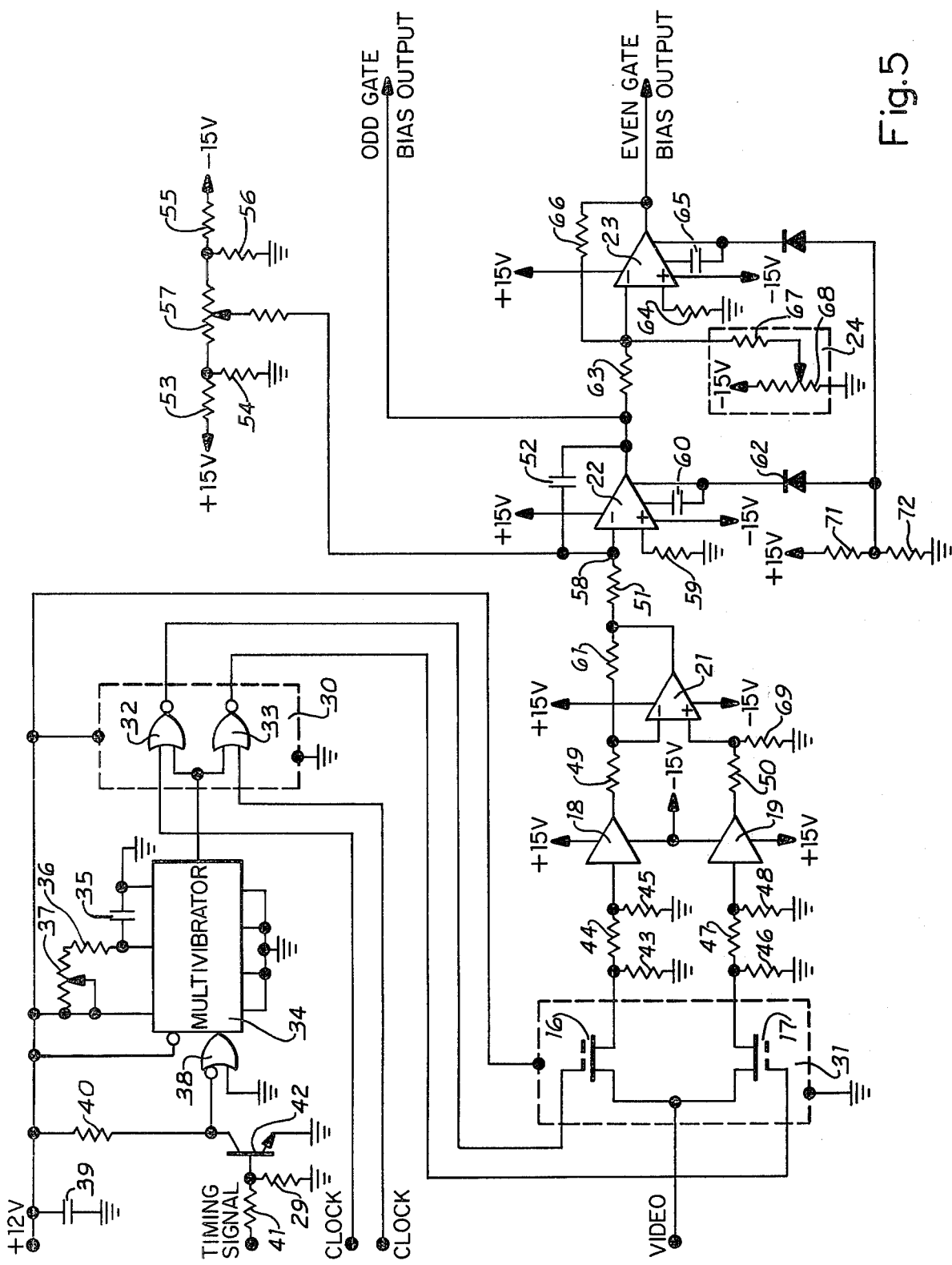
FIG. 5 is a schematic diagram of a preferred embodiment of the present invention.

Referring now to FIG. 5 of the drawings, there is shown a preferred embodiment of the present invention wherein COS/MOS components are used for the major components. The output from video processor 15 is brought into component 31, which, by way of example, might be one-half (½) of a COS/MOS Quad Bilateral Switch of the type CD 4066, made by RCA Corp. The CD 4066 consists of four independent bilateral switches but only two switches 16 and 17 are needed for the present embodiment. Logic drives for switches 16 and 17 are routed through NOR gates 32 and 33, after first being inhibited for the first 50 μs of the Charge Coupled Photodiode scan by multivibrator 34. The inhibit action is employed to gate out the effects of anomalies of the Charge Coupled Photodiode array output at the start of scan. NOR gates 32 and 33 might be of type CD 4001 (Item 30 on drawing) which is also made by RCA Corp. The CD 4001 has four NOR gates, but only two are used for the present embodiment. By way of example, multivibrator 34 might be one-half (½) of an MC 14528 Dual Monotstable Multivibrator made by Motorola, Inc., Austin, Tex. The MC 14528 Multivibrator is a dual, retriggerable, resettable monostable multivibrator and may be triggered from either edge of an input pulse. The multivibrator will produce an accurate output pulse over a wide range of widths and the duration and accuracy are determined by capacitor 35, resistor 36 and potentiometer 37.

A timing signal is applied to NOR gate 38 of multivibrator 34 through resistor 41 and transistor 42 and, after being delayed, is passed to NOR gates 32 and 33, the outputs of which are connected to switches 16 and 17, respectively. Switches 16 and 17 are alternately opened and closed in time synchronism with the odd and even video outputs of the Charge Coupled Photodiode array 11.

The output of switch 16, which is connected to dual broadband buffer amplifier 18 is attenuated by a factor of 2 by resistors 44 and 45 and, likewise, the output of switch 17, which is connected to buffer amplifier 19, is attenuated by a factor of 2 by resistors 47 and 48. This attenuation is provided so that incoming signals do not exceed the dynamic range of amplifier 21. By way of example, amplifiers 18 and 19 are dual voltage followers of the type LH 2110 which is made by National Semiconductor Corp., Santa Clara, Calif., and amplifier 21, which performs the differential amplification function, is of the type HA 2520, which is made by Harris Corporation. As amplifier 21 is a broadband, high slew rate operational amplifier, stability criteria requires that amplifier 21 is operated with a differential closed loop gain of no less than two, and this closed loop gain requirement necessitates the aforementioned attenuators following switches 16 and 17. Differential amplifier 21 drives integrator 22 and resistor 51 and capacitor 52 provide an RC time constant of 100 milliseconds. Because a Charge Coupled Photodiode also possesses some anomalies which cannot be readily gated out at the end of the scan interval, a small error in the closed loop system is generated and a potentiometer network, comprised of resistors 53 through 56 and potentiometer 57, is connected to junction point 58 to balance out that error. Amplifier 22 delivers drive to the odd input gate bias terminal of the Charge Coupled Photodiode array and also drives inverting operational amplifier 23. Since amplifier 23 is required to supply a positive output with the positive input voltage from amplifier 22, an adjustable dc offset voltage is also summed into the input of amplifier 23. Variable offset voltage 24 permits the operating point of the two bias voltages to be adjusted for optimum circuit performance during closed loop operation. By way of example, operational amplifiers 22 and 23 might be type LM 101A, which is made by National Semiconductor Corp., Santa Clara, Calif.

I claim:

1. A temperature stabilization circuit for a Charge Coupled Photodiode array system producing a composite video output signal comprised of even and odd video pulses comprising, means for separating said composite video output signal into even and odd video pulses, a differential amplifier receiving said separated even and odd video pulses and providing an output signal proportional to the differences between the odd and even pulses of said composite video signal, an integrator receiving said output signal of said differential amplifier for supplying an odd gate bias voltage drive to said array system, and an inverting amplifier receiving said output signal of said differential amplifier for supplying an even gate bias voltage drive to said array system thereby balancing odd and even video outputs from said array system.

2. A temperature stabilization circuit for a Charge Coupled Photodiode array system producing a composite video output signal comprised of even and odd video pulses, as set forth in claim 1 wherein said means for separating said composite video output signal into even and odd video pulses includes first and second sample switches connected to said composite video output signal and means for opening and closing said sample switches in time synchronism with said even and odd video outputs of said array.

3. A temperature stabilization circuit for a Charge Coupled Photodiode array system producing a composite video output signal comprised of even and odd video pulses as set forth in claim 2 wherein said first and second sample switches are independent bilateral switches and wherein logic drive for said bilateral switches are routed through first and second NOR gates.

4. A temperature stabilization circuit for a Charge Coupled Photodiode array system producing a composite video output signal comprised of even and odd video pulses as set forth in claim 1 having an adjustable dc offset voltage source summed into the input of said inverting amplifier for providing a positive output from said inverting amplifier.

5. A temperature stabilization circuit for a Charge Coupled Photodiode array system producing a composite video output signal comprised of even and odd video pulses comprising, first and second switches connected to said composite video output signal and logic means for opening and closing said switches in time synchronism with said even and odd video outputs of said array for separating said composite video output signal into even and odd video pulses, a differential amplifier receiving said separated even and odd video pulses and providing an output signal proportional to the differences between the odd and even pulses of said composite video signal, an integrator receiving said output signal of said differential amplifier for supplying an odd gate bias voltage drive to said array system, and an inverting amplifier receiving said output signal of said differential amplifier for supplying an even gate bias voltage drive to said array system thereby balancing odd and even video outputs from said array system.

6. A temperature stabilization circuit for a Charge Coupled Photodiode array system producing a composite video output signal comprised of even and odd video pulses as set forth in claim 5 wherein said first and second switches are independent bilateral switches and wherein logic drive for said bilateral switches are routed through first and second NOR gates.

7. A temperature stabilization circuit for a Charge Coupled Photodiode array system producing a composite video output signal comprised of even and odd video pulses, as set forth in claim 5 having an adjustable dc offset voltage source summed into the input of said inverting amplifier for providing a positive output from said inverting amplifier.

* * * * *